United States Patent
Oh et al.

(10) Patent No.: US 12,119,450 B2
(45) Date of Patent: Oct. 15, 2024

(54) NON-AQUEOUS ELECTROLYTE AND LITHIUM SECONDARY BATTERY INCLUDING THE SAME

(71) Applicant: LG Energy Solution, Ltd., Seoul (KR)

(72) Inventors: Jeong Woo Oh, Daejeon (KR); Hyung Tae Kim, Daejeon (KR); Chul Haeng Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 462 days.

(21) Appl. No.: 17/614,041

(22) PCT Filed: Aug. 25, 2020

(86) PCT No.: PCT/KR2020/011345
§ 371 (c)(1),
(2) Date: Nov. 24, 2021

(87) PCT Pub. No.: WO2021/040388
PCT Pub. Date: Mar. 4, 2021

(65) Prior Publication Data
US 2022/0231339 A1    Jul. 21, 2022

(30) Foreign Application Priority Data
Aug. 30, 2019    (KR) .................. 10-2019-0107365

(51) Int. Cl.

| | | |
|---|---|---|
| *H01M 10/0567* | (2010.01) | |
| *H01M 4/131* | (2010.01) | |
| *H01M 4/134* | (2010.01) | |
| *H01M 4/38* | (2006.01) | |
| *H01M 4/525* | (2010.01) | |
| *H01M 4/587* | (2010.01) | |
| *H01M 10/0525* | (2010.01) | |
| *H01M 10/42* | (2006.01) | |

(52) U.S. Cl.
CPC ....... *H01M 10/0567* (2013.01); *H01M 4/131* (2013.01); *H01M 4/134* (2013.01); *H01M 4/386* (2013.01); *H01M 4/525* (2013.01); *H01M 4/587* (2013.01); *H01M 10/0525* (2013.01); *H01M 10/4235* (2013.01)

(58) Field of Classification Search
None
See application file for complete search history.

(56) References Cited

U.S. PATENT DOCUMENTS

| | | |
|---|---|---|
| 2002/0197537 A1 | 12/2002 | Kim et al. |
| 2005/0244719 A1 | 11/2005 | Kim et al. |
| 2007/0059588 A1 | 3/2007 | Lee et al. |
| 2007/0059606 A1 | 3/2007 | Lee et al. |
| 2011/0200886 A1 | 8/2011 | Deguchi |
| 2018/0175387 A1* | 6/2018 | Kim .............. H01M 4/134 |
| 2018/0375158 A1 | 12/2018 | Morinaka et al. |
| 2019/0181501 A1* | 6/2019 | Ji .............. H01M 4/134 |
| 2019/0198924 A1 | 6/2019 | Kim et al. |
| 2019/0207258 A1 | 7/2019 | Kim et al. |
| 2021/0028493 A1 | 1/2021 | Morinaka et al. |

FOREIGN PATENT DOCUMENTS

| | | |
|---|---|---|
| CN | 103985903 A | 8/2014 |
| CN | 108069884 A | 5/2018 |
| EP | 3165528 A1 | 5/2017 |
| IN | 105336991 A | 2/2016 |
| JP | 2008001672 A | 1/2008 |
| JP | 2015213046 A | 11/2015 |
| JP | 2016091906 A | 5/2016 |
| JP | 2016091907 A | 5/2016 |
| JP | 2018177670 A | 11/2018 |
| KR | 20110079707 A | 7/2011 |
| KR | 20180027986 A | 3/2018 |
| KR | 20180089530 A | 8/2018 |
| KR | 20190025693 A | 3/2019 |
| WO | 2007061180 A1 | 5/2007 |
| WO | 2017111143 A1 | 6/2017 |
| WO | 2018086378 A1 | 5/2018 |

OTHER PUBLICATIONS

Extended European Search Report for Application No. 20856139.9 dated Jun. 20, 2022. 7 pgs.
International Search Report for Application No. PCT/KR2020/011345, dated Dec. 10, 2020, 3 pages.

* cited by examiner

*Primary Examiner* — Gregg Cantelmo
(74) *Attorney, Agent, or Firm* — Lerner David LLP

(57) ABSTRACT

A non-aqueous electrolyte and a lithium secondary battery including the same are disclosed herein. In some embodiments, a non-aqueous electrolyte includes an organic solvent, a lithium salt, and an additive, wherein the additive includes a compound represented by Formula I and a compound represented by Formula II

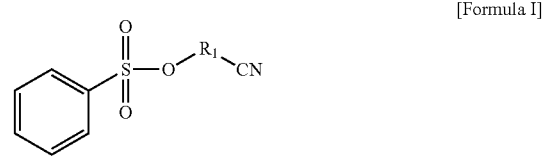

[Formula I]

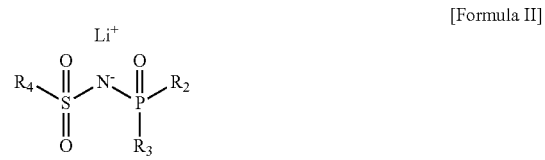

[Formula II]

wherein, in Formula I, $R_1$ is an alkylene group having 1 to 4 carbon atoms, and wherein, in Formula II, $R_2$, $R_3$, and $R_4$ are each independently a fluorine atom or a fluorine-substituted alkyl group having 1 to 10 carbon atoms.

10 Claims, No Drawings

NON-AQUEOUS ELECTROLYTE AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2020/011345, filed on Aug. 25, 2020, which claims priority from Korean Patent Application No. 10-2019-0107365, filed on Aug. 30, 2019, the disclosures of which are incorporated by reference herein.

TECHNICAL FIELD

The present invention relates to a non-aqueous electrolyte and a lithium secondary battery including the same, and more particularly, to a non-aqueous electrolyte, which may suppress an increase in resistance and dissolution of transition metal during high-temperature storage, and a lithium secondary battery including the same.

BACKGROUND ART

A lithium secondary battery is generally prepared by a method in which, after an electrode assembly is formed by disposing a separator between a positive electrode, which includes a positive electrode active material formed of a transition metal oxide containing lithium, and a negative electrode including a negative electrode active material capable of storing lithium ions and the electrode assembly is inserted into a battery case, a non-aqueous electrolyte that becomes a medium for transferring the lithium ions is injected thereinto and the battery case is then sealed.

The non-aqueous electrolyte is generally composed of a lithium salt and an organic solvent capable of dissolving the lithium salt, wherein $LiPF_6$ has been mainly used as the lithium salt. However, since a $PF_6^-$ anion is very vulnerable to heat, the $PF_6^-$ anion is thermally decomposed to generate a Lewis acid, such as $PF_5$, when the battery is exposed to high temperatures. The Lewis acid, such as $PF_5$, not only causes decomposition of the organic solvent such as ethylene carbonate, but also destructs a solid electrolyte interphase (SEI), which is formed by a reduction reaction on a surface of an active material having an operating voltage outside an electrochemical stabilization window of an electrolyte solution, to increase resistance of the battery and degrade life characteristics.

Recently, studies on lithium secondary batteries using a high-nickel (high-Ni)-based positive electrode active material containing a high concentration of nickel with excellent capacity characteristics and/or a silicon-based negative active material have been conducted as the demand for high-capacity batteries has increased. However, since the high-Ni-based positive electrode active material has low structural stability, it has a limitation in that transition metal in the positive electrode active material is dissolved to rapidly degrade battery performance when it is exposed to high temperature or high voltage. Also, with respect to a negative electrode using the silicon-based negative active material, it contains more oxygen-rich (O-rich) components in an SEI than a negative electrode using a carbon-based negative electrode active material, wherein the SEI containing the oxygen-rich components tends to be more easily decomposed when the Lewis acid, such as HF or $PF_5$, is present in an electrolyte. Thus, a decomposition reaction of the SEI on a surface of the negative electrode proceeds as charge and discharge cycles proceed, and this causes additional decomposition of the electrolyte, leading to the degradation of the battery performance.

In order to address the above-described limitations, it has conventionally been attempted to suppress high-temperature degradation by adding a nitrile-based additive, such as succinonitrile, to the electrolyte. However, with respect to the conventional nitrile-based additive, it is known that it is effective to some extent in suppressing the high-temperature degradation, but it is not suitable for a battery requiring high output characteristics due to an increase in resistance.

Therefore, there is a need to develop a lithium secondary battery which has high-capacity characteristics and may prevent performance degradation and an increase in resistance of the battery at high temperatures.

DISCLOSURE OF THE INVENTION

Technical Problem

An aspect of the present invention provides a non-aqueous electrolyte, which may be used in a lithium secondary battery using a high-capacity active material, such as a high-nickel-based positive electrode active material or silicon-based negative electrode active material, to achieve excellent high-temperature stability and high-temperature cycle characteristics and minimize an increase in resistance, and a lithium secondary battery including the same.

Technical Solution

According to an aspect of the present invention, there is provided a non-aqueous electrolyte including an organic solvent, a lithium salt, and an additive, wherein the additive includes a compound represented by the following Formula I and a compound represented by the following Formula II.

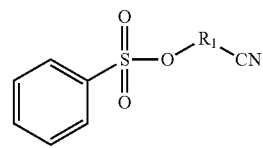

[Formula I]

In Formula I, $R_1$ is an alkylene group having 1 to 4 carbon atoms.

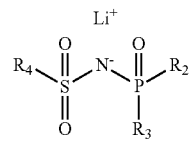

[Formula II]

In Formula II, $R_2$, $R_3$, and $R_4$ are each independently a fluorine atom or a fluorine-substituted alkyl group having 1 to 10 carbon atoms.

According to another aspect of the present invention, there is provided a lithium secondary battery which includes a positive electrode including a positive electrode active material; a negative electrode including a negative electrode active material; a separator disposed between the negative electrode and the positive electrode; and the non-aqueous electrolyte according to the present invention.

Advantageous Effects

Since a compound represented by Formula I, which is included in a non-aqueous electrolyte of the present invention, may effectively control dissolution of transition metal from a positive electrode and may be reductively decomposed to form a stable film on a surface of a negative electrode by including a cyano group and a sulfonate group in its structure, the compound represented by Formula I has an effect of improving high-temperature storage performance and high-temperature lifetime. Also, the compound represented by Formula I may control a low-voltage phenomenon caused by the transition metal and foreign matter in a battery.

Also, a compound represented by Formula II, which is included in the non-aqueous electrolyte of the present invention, is a compound containing nitrogen (N), fluorine (F), a sulfone group, and a phosphoryl group in its structure, wherein, since an N atom in the compound acts as a Lewis base to scavenge a Lewis acid generated as an electrolyte decomposition product, it may suppress additional decomposition of an organic solvent in the electrolyte, and, since the F atom is separated from the compound to form LiF as a component of a negative electrode solid electrolyte interphase (SEI), it allows the negative electrode SEI to be stably formed.

The compound represented by Formula II is a lithium (Li) salt-type additive, wherein it may not only provide a Li source in an electrolyte solution, but is also reductively/oxidatively decomposed to participate in negative/positive electrode film formation reactions, and thus, it may reduce diffusion resistance as well as interfacial resistance.

In a case in which the compound represented by Formula I and the compound represented by Formula II are used together, there is an effect of reducing initial resistance in comparison to a case where the compound represented by Formula I is used alone.

Thus, if the non-aqueous electrolyte of the present invention including the compound represented by Formula I and the compound represented by Formula II together is used, a lithium secondary battery having excellent high-temperature storability and high-temperature cycle characteristics may be achieved while minimizing an increase in resistance. The non-aqueous electrolyte of the present invention is particularly suitable for a high-power battery using high-capacity active materials, such as a high-nickel-based positive electrode active material and a silicon-based negative electrode material, together.

MODE FOR CARRYING OUT THE INVENTION

Hereinafter, the present invention will be described in more detail.

Non-Aqueous Electrolyte

A non-aqueous electrolyte according to the present invention includes a lithium salt, an organic solvent, and an additive, wherein the additive includes a compound represented by Formula I and a compound represented by Formula II below.

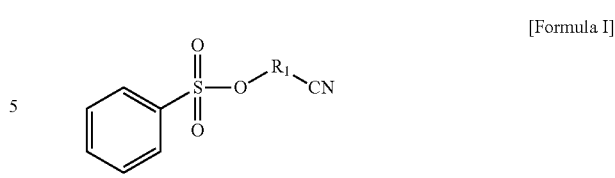

[Formula I]

In Formula I, $R_1$ is an alkylene group having 1 to 4 carbon atoms.

[Formula II]

In Formula II, $R_2$, $R_3$, and $R_4$ are each independently a fluorine atom or a fluorine-substituted alkyl group having 1 to 10 carbon atoms.

(1) Lithium Salt

Various lithium salts typically used in an electrolyte for a lithium secondary battery may be used as the lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CH_3SO_3^-$, $CF_3(CF_2)_7SO_3^-$, $CF_3CO_2^-$, $CH_3CO_2^-$, $SCN^-$, and $(CF_3CF_2SO_2)_2N^-$ as an anion.

Specifically, the lithium salt may include at least one selected from the group consisting of LiCl, LiBr, LiI, $LiBF_4$, $LiClO_4$, $LiAlO_4$, $LiAlCl_4$, $LiPF_6$, $LiSbF_6$, $LiAsF_6$, $LiB_{10}Cl_{10}$, $LiBOB(LiB(C_2O_4)_2)$, $LiCF_3SO_3$, LiTFSI (LiN$(SO_2CF_3)_2$), LiFSI(LiN$(SO_2F)_2$), $LiCH_3SO_3$, $LiCF_3CO_2$, $LiCH_3CO_2$, and LiBETI (LiN$(SO_2CF_2CF_3)_2$). Specifically, the lithium salt may include a single material selected from the group consisting of $LiBF_4$, $LiClO_4$, $LiPF_6$, LiBOB(LiB$(C_2O_4)_2$), $LiCF_3SO_3$, LiTFSI (LiN$(SO_2CF_3)_2$), and LiBETI (LiN$(SO_2CF_2CF_3)_2$), or a mixture of two or more thereof.

The lithium salt may be appropriately changed in a normally usable range, but may be included in a concentration of 0.8 M to 4.0 M, for example, 1.0 M to 3.0 M in an electrolyte solution to obtain an optimum effect of forming a film for preventing corrosion of a surface of an electrode.

If the concentration of the lithium salt is less than 0.8 M, an effect of improving low-temperature output and cycle characteristics during high-temperature storage of a lithium secondary battery is insignificant, and, if the concentration of the lithium salt is greater than 4.0 M, impregnability of the electrolyte solution may be reduced due to an increase in viscosity of the non-aqueous electrolyte solution.

(2) Organic Solvent

Various organic solvents typically used in a lithium electrolyte may be used as the organic solvent without limitation. For example, the organic solvent may include a cyclic carbonate-based organic solvent, a linear carbonate-based organic solvent, or a mixed organic solvent thereof.

The cyclic carbonate-based organic solvent is an organic solvent which may well dissociate the lithium salt in the electrolyte due to high permittivity as a highly viscous organic solvent, wherein specific examples of the cyclic carbonate-based organic solvent may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and, among them, the cyclic carbonate-based organic solvent may include ethylene carbonate.

Also, the linear carbonate-based organic solvent is an organic solvent having low viscosity and low permittivity, wherein typical examples of the linear carbonate-based organic solvent may be at least one organic solvent selected from the group consisting of dimethyl carbonate (DMC), diethyl carbonate (DEC), dipropyl carbonate, ethyl methyl carbonate (EMC), methylpropyl carbonate, and ethylpropyl carbonate, and the linear carbonate-based organic solvent may specifically include ethyl methyl carbonate (EMC).

Furthermore, the organic solvent may further include a linear ester-based organic solvent and/or a cyclic ester-based organic solvent in addition to the cyclic carbonate-based organic solvent and/or the linear carbonate-based organic solvent to prepare an electrolyte solution having high ionic conductivity.

Specific examples of the linear ester-based organic solvent may be at least one organic solvent selected from the group consisting of methyl acetate, ethyl acetate, propyl acetate, methyl propionate, ethyl propionate, propyl propionate, and butyl propionate.

Also, the cyclic ester-based organic solvent may include at least one organic solvent selected from the group consisting of γ-butyrolactone, γ-valerolactone, γ-caprolactone, σ-valerolactone, and ε-caprolactone.

The organic solvent may be used by adding an organic solvent typically used in an electrolyte solution for a lithium secondary battery without limitation, if necessary. For example, the organic solvent may further include at least one organic solvent selected from an ether-based organic solvent, an amide-based organic solvent, and a nitrile-based organic solvent.

(3) Additive

The non-aqueous electrolyte of the present invention includes a compound represented by Formula I and a compound represented by Formula II as an additive.

[Formula I]

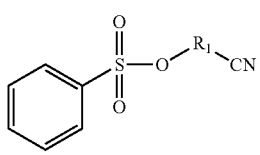

In Formula I, $R_1$ is an alkylene group having 1 to 4 carbon atoms, preferably an alkylene group having 1 to 3 carbon atoms, and more preferably a methylene group or ethylene group.

For example, the compound represented by Formula I may be a compound represented by Formula I-1 below.

[Formula I-1]

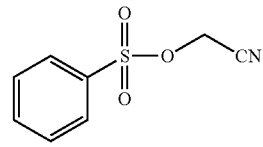

The compound represented by Formula I suppresses dissolution of transition metal and improves high-temperature durability by including a cyano group and a sulfonate group in its structure. Specifically, since the compound represented by Formula I is reductively decomposed to form a stable film on a surface of a positive electrode, it may suppress the dissolution of the transition metal and a decomposition reaction of the electrolyte at high temperatures.

The compound represented by Formula I may be included in an amount of 0.5 wt % to 2 wt %, for example, 0.5 wt % to 1.5 wt % based on a total weight of the non-aqueous electrolyte. In a case in which the amount of the compound represented by Formula I satisfies the above range, the dissolution of the transition metal of a positive electrode active material at high temperatures may be effectively suppressed, and excellent high-temperature durability may be achieved. If the amount of the compound represented by Formula I is excessively small, an effect of improving the high-temperature durability is insignificant, and, if the amount of the compound represented by [Formula I] is excessively large, since resistance is increased, output characteristics may be degraded.

[Formula II]

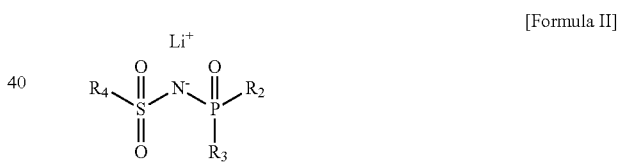

In Formula II, $R_2$, $R_3$, and $R_4$ are each independently a fluorine atom or a fluorine-substituted alkyl group having 1 to 10 carbon atoms, and preferably, $R_2$, $R_3$, and $R_4$ are fluorine atoms.

For example, the compound represented by Formula II may be a compound represented by Formula II-1 below.

[Formula II-1]

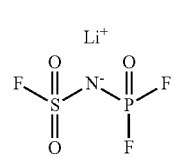

Since the compound represented by Formula II suppresses the decomposition reaction of the electrolyte at high temperatures and allows a negative electrode solid electrolyte interphase (SEI) to be stably formed, it may improve the high-temperature durability and may suppress the increase in resistance, and thus, it may achieve excellent output characteristics.

Specifically, the compound represented by [Formula II] includes a nitrogen (N) atom acting as a Lewis base in its structure to scavenge a Lewis acid generated as an electrolyte decomposition product, it may suppress additional decomposition of the organic solvent in the electrolyte. Also, since the F atom included in the compound represented by Formula I is decomposed to form LiF as a component of the negative electrode SEI, it allows the negative electrode SEI to be stably formed.

The compound represented by Formula II may be included in an amount of 0.5 wt % to 2 wt %, for example, 0.5 wt % to 1.5 wt % based on the total weight of the non-aqueous electrolyte. In a case in which the amount of the compound represented by Formula II satisfies the above range, the increase in resistance may be effectively suppressed, and excellent high-temperature durability may be achieved. If the amount of the compound of Formula II is excessively small, an effect of suppressing the increase in resistance is insignificant, and, if the amount of the compound of Formula II is excessively large, the compound of Formula II may not be dissolved in the electrolyte solution.

A total amount of the compound represented by Formula I and the compound represented by Formula II may be in a range of 1 wt % to 4 wt %, preferably 1 wt % to 3 wt %, and more preferably 1 wt % to 2 wt % based on the total weight of the non-aqueous electrolyte. If the amount of the compounds of Formula I and Formula II is excessively small, the effect of improving the high-temperature durability is insignificant, and, if the amount of the compounds of Formula I and Formula II is excessively large, the compounds of Formula I and Formula II may not be dissolved well in the electrolyte solution and the output characteristics may be degraded.

According to the research of the present inventors, in a case in which the compound represented by Formula I and the compound represented by Formula II are used together as in the present invention, there is an effect of significantly improving resistance characteristics during high-temperature cycles and swelling characteristics after high-temperature storage in comparison to a case where other types of additives are used or only one of the compounds represented by Formula I or Formula II is used.

(4) Additional Additives

In order to prevent a non-aqueous electrolyte solution from being decomposed to cause collapse of a negative electrode in a high output environment, or further improve low-temperature high-rate discharge characteristics, high-temperature stability, overcharge protection, and a battery swelling suppression effect at high temperatures, the non-aqueous electrolyte according to the present invention may further include other additional additives in addition to the compounds represented by Formulae I and II, if necessary.

Examples of the additional additive may be at least one selected from the group consisting of a cyclic carbonate-based compound, a halogen-substituted carbonate-based compound, a sultone-based compound, a sulfate-based compound, a phosphate-based compound, a borate-based compound, a nitrile-based compound, a benzene-based compound, an amine-based compound, a silane-based compound, and a lithium salt-based compound.

The cyclic carbonate-based compound, for example, may include vinylene carbonate (VC) or vinyl ethylene carbonate.

The halogen-substituted carbonate-based compound, for example, may include fluoroethylene carbonate (FEC).

The sultone-based compound, for example, may include at least one compound selected from the group consisting of 1,3-propane sultone (PS), 1,4-butane sultone, ethane sultone, 1,3-propene sultone (PRS), 1,4-butene sultone, and 1-methyl-1,3-propene sultone.

The sulfate-based compound, for example, may include ethylene sulfate (Esa), trimethylene sulfate (TMS), or methyl trimethylene sulfate (MTMS).

The phosphate-based compound, for example, may include at least one compound selected from the group consisting of lithium difluoro bis(oxalato)phosphate, lithium difluorophosphate, tetramethyl trimethylsilyl phosphate, trimethylsilyl phosphite, tris(2,2,2-trifluoroethyl)phosphate, and tris(trifluoroethyl)phosphite.

The borate-based compound, for example, may include tetraphenylborate and lithium oxalyldifluoroborate.

The nitrile-based compound, for example, may include at least one compound selected from the group consisting of succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The benzene-based compound, for example, may include fluorobenzene, the amine-based compound may include triethanolamine or ethylenediamine, and the silane-based compound may include tetravinylsilane.

The lithium salt-based compound is a compound different from the lithium salt included in the non-aqueous electrolyte solution, wherein the lithium salt-based compound may include at least one compound selected from the group consisting of $LiPO_2F_2$, LiODFB, LiBOB (lithium bis(oxalato)borate ($LiB(C_2O_4)_2$)), and $LiBF_4$.

In a case in which vinylene carbonate, vinyl ethylene carbonate, or succinonitrile, among these additional additives, is included, a more robust SEI may be formed on a surface of the negative electrode during an initial activation process of the secondary battery.

In a case in which $LiBF_4$ is included, high-temperature stability of the secondary battery may be improved by suppressing the generation of gas which may be generated due to the decomposition of the electrolyte solution during high-temperature storage.

The additional additives may be used as a mixture of two or more thereof, and may be included in an amount of 0.01 wt % to 50 wt %, particularly 0.01 wt % to 10 wt %, and preferably 0.05 wt % to 5 wt % based on a total weight of the non-aqueous electrolyte. If the amount of the additional additive is less than 0.01 wt %, effects of improving low-temperature output, high-temperature storage characteristics, and high-temperature life characteristics of the battery are insignificant, and, if the amount of the additional additive is greater than 50 wt %, there is a possibility that the side reaction occurs excessively during charge and discharge of the battery due to the excessive amount of the additive. Particularly, since the additives for forming an SEI may not be sufficiently decomposed at high temperatures when excessive amounts of the additives for forming an SEI are added, an unreacted material may be formed in the electrolyte solution at room temperature, or the additives for forming an SEI may be present in the form of precipitates. Accordingly, a side reaction may occur in which life or resistance characteristics of the secondary battery are degraded.

Lithium Secondary Battery

Next, a lithium secondary battery according to the present invention will be described.

The lithium secondary battery according to the present invention includes a positive electrode, a negative electrode, a separator disposed between the positive electrode and the negative electrode, and a non-aqueous electrolyte, and, in this case, the non-aqueous electrolyte is the non-aqueous electrolyte according to the present invention. Since the non-aqueous electrolyte has been described above, a description thereof will be omitted and other components will be described below.

(1) Positive Electrode

The positive electrode according to the present invention may include a positive electrode active material layer including a positive electrode active material, and, if necessary, the positive electrode active material layer may further include a conductive agent and/or a binder.

The positive electrode active material is a compound capable of reversibly intercalating and deintercalating lithium, wherein the positive electrode active material may specifically include a lithium composite metal oxide including lithium and at least one transition metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$)), lithium-nickel-cobalt-based oxide (e.g., $LiNi_{1-Y1}Co_{Y1}O_2$ (where $0<Y1<1$)), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$)), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), or lithium-nickel-cobalt-transition metal (M) oxide (e.g., $Li(Ni_{p2}Co_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and S2 are atomic fractions of each independent elements, wherein $0<p2<1$, $0<q2<1$, $0<r3<1$, $0<S2<1$, and $p2+q2+r3+S2=1$), and any one thereof or a compound of two or more thereof may be included.

Specifically, the lithium composite metal oxide may be a lithium composite transition metal oxide having an amount of nickel among transition metals of 50 atm % or more, for example, 70 atm % or more, and, more specifically, may be a lithium nickel cobalt manganese-based oxide represented by Formula III below.

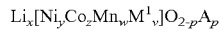

[Formula III]

In Formula III, $M^1$ is a doping element substituted for transition metal sites and may include at least one element selected from the group consisting of tungsten (W), copper (Cu), iron (Fe), vanadium (V), chromium (Cr), titanium (Ti), zirconium (Zr), zinc (Zn), aluminum (Al), indium (In), tantalum (Ta), yttrium (Y), lanthanum (La), strontium (Sr), gallium (Ga), scandium (Sc), gadolinium (Gd), samarium (Sm), calcium (Ca), cerium (Ce), niobium (Nb), magnesium (Mg), boron (B), and molybdenum (Mo).

A is an element substituted for oxygen sites and may include at least one element selected from the group consisting of fluorine (F), chlorine (Cl), bromine (Br), iodine (I), astatine (At), and sulfur (S).

x represents an atomic ratio of lithium to total transition metals in the lithium nickel cobalt manganese-based oxide, wherein x may be in a range of 0.8 to 1.2, for example, 1 to 1.2.

y represents an atomic ratio of nickel among the transition metals in the lithium nickel cobalt manganese-based oxide, wherein y is in a range of 0.5 or more to less than 1, preferably 0.7 to less than 1, and more preferably 0.75 to 0.98. Since higher capacity may be achieved as an amount of the nickel among the transition metals is increased, that the atomic ratio of the nickel is 0.5 or more is more advantageous for achieving high capacity.

z represents an atomic ratio of cobalt among the transition metals in the lithium nickel cobalt manganese-based oxide, wherein z is in a range of greater than 0 to less than 0.5, preferably 0.01 to 0.3, and more preferably 0.01 to 0.25.

w represents an atomic ratio of manganese among the transition metals in the lithium nickel cobalt manganese-based oxide, wherein w is in a range of greater than 0 to less than 0.5, preferably 0.01 to 0.3, and more preferably 0.01 to 0.25.

v represents an atomic ratio of the doping element $M^1$ doped into the transition metal sites in the lithium nickel cobalt manganese-based oxide, wherein v may be in a range of 0 to 0.2, for example, 0 to 0.1. In a case in which the doping element $M^1$ is added, there is an effect of improving structural stability of the lithium nickel cobalt manganese-based oxide, but, since capacity may be reduced when the amount of the doping element is increased, it is desirable that the doping element is included at an atomic ratio of 0.2 or less.

p represents an atomic ratio of the element A substituted for the oxygen sites, wherein p may be in a range of 0 to 0.2, for example, 0 to 0.1.

In Formula III, $y+z+w+v=1$.

Specific examples of the lithium nickel cobalt manganese-based oxide may be $LiNi_{0.5}Co_{0.2}Mn_{0.3}O_2$, $LiNi_{0.5}Co_{0.3}Mn_{0.2}O_2$, $LiNi_{0.6}Co_{0.2}Mn_{0.2}O_2$, and $LiNi_{0.8}Co_{0.1}Mn_{0.1}O_2$, but the lithium nickel cobalt manganese-based oxide is not limited thereto.

The positive electrode active material may be included in an amount of 80 wt % to 98 wt %, for example, 85 wt % to 98 wt % based on a total weight of the positive electrode active material layer. When the positive electrode active material is included in an amount within the above range, excellent capacity characteristics may be exhibited.

Next, the conductive agent is used to provide conductivity to the electrode, wherein any conductive agent may be used without particular limitation as long as it has suitable electron conductivity without causing adverse chemical changes in the battery.

Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used.

The conductive agent may be included in an amount of 0.1 wt % to 10 wt %, for example, 0.1 wt % to 5 wt % based on the total weight of the positive electrode active material layer.

Next, the binder improves the adhesion between the positive electrode active material particles and the adhesion between the positive electrode active material and a current collector.

Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 wt % to 15 wt %, for example, 0.1 wt % to 10 wt % based on the total weight of the positive electrode active material layer.

The positive electrode of the present invention as described above may be prepared by a method of preparing a positive electrode which is known in the art. For example, the positive electrode may be prepared by a method in which a positive electrode collector is coated with a positive electrode slurry, which is prepared by dissolving or dispersing the positive electrode active material, the binder, and/or the conductive agent in a solvent, dried, and then rolled, or a method in which the positive electrode slurry is cast on a separate support, and a film separated from the support is then laminated on the positive electrode collector.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode material. The positive electrode collector, for example, may be used in various shapes such as that of a film, a sheet, a foil, a net, a porous body, a foam body, a non-woven fabric body, and the like.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the positive electrode material mixture may be adjusted to have an appropriate viscosity in consideration of a coating thickness of the positive electrode material mixture, manufacturing yield, and workability, and is not particularly limited.

(2) Negative Electrode

Next, a negative electrode will be described.

The negative electrode according to the present invention includes a negative electrode active material layer including a negative electrode active material, and the negative electrode active material layer may further include a conductive agent and/or a binder, if necessary.

As the negative electrode active material, various negative electrode active materials used in the art, for example, a carbon-based negative electrode active material, a silicon-based negative electrode active material, or a mixture thereof may be used.

According to an embodiment, the negative electrode active material may include a carbon-based negative electrode active material, and, as the carbon-based negative electrode active material, various carbon-based negative electrode active materials used in the art, for example, a graphite-based materials such as natural graphite, artificial graphite, and Kish graphite; pyrolytic carbon, mesophase pitch based carbon fiber, meso-carbon microbeads, mesophase pitches, high-temperature sintered carbon such as petroleum or coal tar pitch derived cokes, soft carbon, and hard carbon may be used. A shape of the carbon-based negative electrode active material is not particularly limited, and materials of various shapes, such as an irregular shape, planar shape, flaky shape, spherical shape, or fibrous shape, may be used.

Preferably, the carbon-based negative electrode active material may include at least one of natural graphite and artificial graphite. More preferably, the carbon-based negative electrode active material may include natural graphite and artificial graphite. In a case in which the natural graphite and the artificial graphite are used together, adhesion with the current collector may be increased to suppress exfoliation of the active material.

According to another embodiment, the negative electrode active material may include a silicon-based negative electrode active material, and the silicon-based negative electrode active material, for example, may include at least one selected from the group consisting of metallic silicon (Si), silicon oxide ($SiO_x$, where $0<x\leq2$), silicon carbide (SiC), and a Si—Y alloy (where Y is an element selected from the group consisting of alkali metal, alkaline earth metal, a Group 13 element, a Group 14 element, transition metal, a rare earth element, and a combination thereof, and is not Si). The element Y may be selected from the group consisting of Mg, Ca, Sr, barium (Ba), radium (Ra), Sc, Y, Ti, Zr, hafnium (Hf), rutherfordium (Rf), V, Nb, Ta, dubidium (db), Cr, Mo, W, seaborgium (Sg), technetium (Tc), rhenium (Re), bohrium (Bh), Fe, lead (Pb), ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, Ga, tin (Sn), In, germanium (Ge), phosphorus (P), arsenic (As), antimony (Sb), bismuth (Bi), S, selenium (Se), tellurium (Te), polonium (Po), and a combination thereof.

Since the silicon-based negative electrode active material has higher capacity characteristics than the carbon-based negative electrode active material, better capacity characteristics may be obtained when the silicon-based negative electrode active material is further included. However, with respect to a negative electrode including the silicon-based negative electrode active material, it contains more O-rich components in the SEI than a graphite negative electrode, and the SEI containing the O-rich components tends to be more easily decomposed when a Lewis acid, such as HF or $PF_5$, is present in the electrolyte. Thus, with respect to the negative electrode including the silicon-based negative electrode active material, there is a need to suppress the formation of the Lewis acid, such as HF and $PF_5$, or remove (or scavenge) the formed Lewis acid in order to stably maintain the SEI. Since the non-aqueous electrolyte according to the present invention includes the compound of Formula II containing the N atom acting as a Lewis base and the F atom improving stability of the SEI on the surface of the negative electrode as an additive, it may effectively suppress the decomposition of the SEI when the negative electrode including the silicon-based negative electrode active material is used.

According to another embodiment, the negative electrode active material may include a mixture of a carbon-based negative electrode active material and a silicon-based negative electrode active material.

Specific examples of the carbon-based negative electrode active material and the silicon-based negative electrode active material are the same as described above.

A mixing ratio of the silicon-based negative electrode active material to the carbon-based negative electrode active material may be in a range of 3:97 to 99:1, preferably 5:95 to 30:70, and more preferably 5:95 to 15:85, as a weight ratio. In a case in which the mixing ratio of the silicon-based negative electrode active material to the carbon-based negative electrode active material satisfies the above range, since a volume expansion of the silicon-based negative electrode active material is suppressed while capacity characteristics are improved, excellent cycle performance may be secured.

The negative electrode active material may be included in an amount of 80 wt % to 99 wt % based on a total weight of the negative electrode active material layer. In a case in which the amount of the negative electrode active material satisfies the above range, excellent capacity characteristics and electrochemical properties may be obtained.

Next, the conductive agent is a component for further improving conductivity of the negative electrode active material, wherein the conductive agent may be added in an amount of 10 wt % or less, for example, 5 wt % or less based on the total weight of the negative electrode active material layer. Any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The binder is a component that assists in the binding between the conductive agent, the active material, and the current collector, wherein the binder is commonly added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene polymer (EPDM), a sulfonated EPDM, a styrene-butadiene rubber, a nitrile-butadiene rubber, a fluoro rubber, and various copolymers thereof.

The negative electrode may be prepared by a method of preparing a negative electrode which is known in the art. For example, the negative electrode may be prepared by a method in which a negative electrode collector is coated with a negative electrode slurry, which is prepared by dissolving or dispersing the negative electrode active material as well as selectively the binder and the conductive agent in a solvent, rolled and dried, or may be prepared by casting the negative electrode slurry on a separate support and then laminating a film separated from the support on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. The negative electrode collector may typically have a thickness of 3 µm to 500 µm, and, similar to the positive electrode collector, microscopic irregularities may be formed on the surface of the collector to improve the adhesion of the negative electrode active material. The negative electrode collector, for example, may be used in various shapes such as that of a film, a sheet, a foil, a net, a porous body, a foam body, a non-woven fabric body, and the like.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the negative electrode slurry may be adjusted to have an appropriate viscosity in consideration of a coating thickness of the negative electrode material mixture, manufacturing yield, and workability, and is not particularly limited.

(3) Separator

The lithium secondary battery according to the present invention includes a separator between the positive electrode and the negative electrode.

The separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used.

Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

The lithium secondary battery according to the present invention as described above may be suitably used in portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to examples.

Example 1

(Non-Aqueous Electrolyte Preparation)

After $LiPF_6$ was dissolved in 98.5 g of a non-aqueous organic solvent, in which ethylene carbonate (EC) and ethyl methyl carbonate (EMC) were mixed in a volume ratio of 30:70, such that a concentration of the $LiPF_6$ was 1.0 M, a non-aqueous electrolyte was prepared by adding 0.5 g of the compound represented by Formula I-1 and 1.0 g of the compound represented by Formula II-1 as an additive.

(Positive Electrode Preparation)

A lithium nickel-manganese-cobalt-based oxide ($LiNi_{0.8}Co_{0.1}Mn_{0.1}O_2$; NCM811) as positive electrode active material particles, carbon black as a conductive agent, and polyvinylidene fluoride (PVDF), as a binder, were added to N-methyl-2-pyrrolidone (NMP), as a solvent, at a weight ratio of 90:5:5 to prepare a positive electrode active material slurry (solid content 48 wt %). A 100 μm thick positive electrode collector (Al thin film) was coated with the positive electrode active material slurry, dried, and roll-pressed to prepare a positive electrode.

(Negative Electrode Preparation)

A negative electrode active material (artificial graphite: SiO=95:5 weight ratio), PVDF as a binder, and carbon black, as a conductive agent, were added to NMP, as a solvent, at a weight ratio of 95:2:3 to prepare a negative electrode active material slurry (solid content: 70 wt %). A 90 μm thick negative electrode collector (Cu thin film) was coated with the negative electrode active material slurry, dried, and roll-pressed to prepare a negative electrode.

(Secondary Battery Preparation)

After an electrode assembly was prepared by a conventional method of sequentially stacking a polyethylene porous film with the positive electrode and negative electrode prepared by the above-described methods, the electrode assembly was put in a pouch-type secondary battery case, and the above-prepared non-aqueous electrolytes was injected thereinto to prepare a lithium secondary battery.

Example 2

A lithium secondary battery was prepared in the same manner as in Example 1 except that, after $LiPF_6$ was dissolved in 98.0 g of a non-aqueous organic solvent such that a concentration of the $LiPF_6$ was 1.0 M, a non-aqueous electrolyte was prepared by adding 1.0 g of the compound represented by Formula I-1 and 1.0 g of the compound represented by Formula II-1 as an additive.

Example 3

A lithium secondary battery was prepared in the same manner as in Example 1 except that, after $LiPF_6$ was dissolved in 98.0 g of a non-aqueous organic solvent such that a concentration of the $LiPF_6$ was 1.0 M, a non-aqueous electrolyte was prepared by adding 1.5 g of the compound represented by Formula I-1 and 0.5 g of the compound represented by Formula II-1 as an additive.

Example 4

A lithium secondary battery was prepared in the same manner as in Example 1 except that, after $LiPF_6$ was dissolved in 98.0 g of a non-aqueous organic solvent such that a concentration of the $LiPF_6$ was 1.0 M, a non-aqueous electrolyte was prepared by adding 0.5 g of the compound represented by Formula I-1 and 1.5 g of the compound represented by Formula II-1 as an additive.

Comparative Example 1

A lithium secondary battery was prepared in the same manner as in Example 1 except that a non-aqueous electrolyte was prepared by dissolving $LiPF_6$ in 100 g of a non-aqueous organic solvent, in which ethylene carbonate (EC) and ethyl methyl carbonate (EMC) were mixed in a volume ratio of 30:70, such that a concentration of the $LiPF_6$ was 1.0 M, and not adding an additive.

Comparative Example 2

A lithium secondary battery was prepared in the same manner as in Example 1 except that, after $LiPF_6$ was dissolved in 99.5 g of a non-aqueous organic solvent, in which ethylene carbonate (EC) and ethyl methyl carbonate (EMC) were mixed in a volume ratio of 30:70, such that a concentration of the $LiPF_6$ was 1.0 M, a non-aqueous electrolyte was prepared by adding 0.5 g of the compound represented by Formula I-1 as an additive.

Comparative Example 3

A lithium secondary battery was prepared in the same manner as in Example 1 except that, after $LiPF_6$ was dissolved in 99.0 g of a non-aqueous organic solvent, in which ethylene carbonate (EC) and ethyl methyl carbonate (EMC) were mixed in a volume ratio of 30:70, such that a concentration of the $LiPF_6$ was 1.0 M, a non-aqueous electrolyte was prepared by adding 1.0 g of the compound represented by Formula II-1 as an additive.

Comparative Example 4

A lithium secondary battery was prepared in the same manner as in Example 1 except that, after $LiPF_6$ was dissolved in 98.5 g of a non-aqueous organic solvent, in which ethylene carbonate (EC) and ethyl methyl carbonate (EMC) were mixed in a volume ratio of 30:70, such that a concentration of the $LiPF_6$ was 1.0 M, a non-aqueous electrolyte was prepared by adding 1.5 g of the compound represented by Formula I-1 as an additive.

Comparative Example 5

A lithium secondary battery was prepared in the same manner as in Example 1 except that, after $LiPF_6$ was dissolved in 98.5 g of a non-aqueous organic solvent, in which ethylene carbonate (EC) and ethyl methyl carbonate (EMC) were mixed in a volume ratio of 30:70, such that a concentration of the $LiPF_6$ was 1.0 M, a non-aqueous electrolyte was prepared by adding 1.5 g of the compound represented by Formula II-1 as an additive.

Experimental Example 1: High-Temperature Storage Characteristics Evaluation

After each of the lithium secondary batteries prepared by Examples 1 to 4 and Comparative Examples 1 to 5 was charged at 0.33 C to 4.2 V under a constant current/constant voltage (CC/CV) condition, each lithium secondary battery was discharged to a depth of discharge (DOD) of 50% to adjust a state of charge (SOC) to 50% and then discharged at 2.5 C rate for 10 seconds to measure initial resistance.

Also, after each of the lithium secondary batteries prepared by Examples 1 to 4 and Comparative Examples 1 to 5 was fully charged (SOC 100, 50 mA cut off) at 0.33 C to 4.2 V under a CC/CV condition, the fully charged lithium secondary battery was stored at 60° C. for 4 weeks and volume increase rate and capacity retention were then measured. The volume increase rate was calculated according to Equation (1) below, and the capacity retention was calculated according to Equation (2) below.

Volume increase rate (%) = {(volume of lithium secondary battery after 4 weeks storage − volume of lithium secondary battery before storage)/volume of lithium secondary battery before storage} × 100   Equation (1)

Capacity retention (%) = {discharge capacity after 4 weeks storage/ discharge capacity before storage} × 100   Equation (2)

TABLE 1

|  | Additive amount (wt %) | | Initial resistance (mohm) | Volume increase rate (%) | Capacity retention (%) |
| --- | --- | --- | --- | --- | --- |
|  | Formula I-1 | Formula II-1 |  |  |  |
| Example 1 | 0.5 | 1.0 | 81.45 | 0.77 | 91.28 |
| Example 2 | 1.0 | 1.0 | 81.98 | 0.23 | 92.10 |
| Example 3 | 1.5 | 0.5 | 83.14 | 0.20 | 92.56 |
| Example 4 | 0.5 | 1.5 | 80.69 | 0.71 | 91.35 |
| Comparative Example 1 | 0 | 0 | 84.84 | 7.28 | 89.00 |
| Comparative Example 2 | 0.5 | 0 | 85.51 | 5.45 | 89.75 |
| Comparative Example 3 | 0 | 1 | 76.34 | 7.34 | 88.16 |
| Comparative Example 4 | 1.5 | 0 | 87.43 | 3.65 | 90.64 |
| Comparative Example 5 | 0 | 1.5 | 75.64 | 8.64 | 87.31 |

Referring to Table 1, with respect to Examples 1 to 4 using the compounds of Formula I and Formula II together as an electrolyte solution additive, it may be confirmed that volume increase rates after high-temperature storage were significantly smaller and capacity retentions were higher than Comparative Example 1 without using an additive and Comparative Examples 2 to 5 using only one of the compounds of Formula I or Formula II as an additive.

Experimental Example 2: High-Temperature Cycle Characteristics Evaluation

After each of the lithium secondary batteries prepared by Examples 1 to 4 and Comparative Examples 1 to 5 was charged at 0.33 C to 4.2 V under a CC/CV condition, each lithium secondary battery was discharged to a DOD of 50% to adjust a SOC to 50% and then discharged at 2.5 C rate for 10 seconds to measure initial resistance.

Then, that each of the lithium secondary batteries prepared by Examples 1 to 4 and Comparative Examples 1 to 5 was charged at 0.33 C to 4.2 V under a CC/CV condition at 45° C. and was then discharged at a CC of 0.33 C to 3 V was set as one cycle, and 160 cycles of the charging and discharging were performed to measure capacity retention and resistance increase rate. The capacity retention was calculated according to the following Equation (3), and the resistance increase rate was calculated according to the following Equation (4). Measurement results are listed in [Table 2] below.

Capacity retention (%) = (discharge capacity after 160 cycles/ discharge capacity after one cycle) × 100   Equation (3)

Resistance increase rate (%) = (resistance after 160 cycles/initial resistance) × 100   Equation (4)

TABLE 2

|  | Additive amount (wt %) | | Initial resistance (mohm) | Resistance increase rate (%) | Capacity retention (%) |
| --- | --- | --- | --- | --- | --- |
|  | Formula I-1 | Formula II-1 |  |  |  |
| Example 1 | 0.5 | 1.0 | 81.45 | 7.41 | 88.02 |
| Example 2 | 1.0 | 1.0 | 81.98 | 3.65 | 89.54 |
| Example 3 | 1.5 | 0.5 | 83.14 | 1.34 | 91.67 |
| Example 4 | 0.5 | 1.5 | 80.69 | 8.67 | 88.64 |
| Comparative Example 1 | 0 | 0 | 84.84 | 12.45 | 80.97 |
| Comparative Example 2 | 0.5 | 0 | 85.51 | 4.13 | 88.91 |
| Comparative Example 3 | 0 | 1 | 76.34 | 10.57 | 86.12 |
| Comparative Example 4 | 1.5 | 0 | 87.43 | 9.42 | 86.74 |
| Comparative Example 5 | 0 | 1.5 | 75.64 | 11.65 | 84.31 |

Referring to Table 2, with respect to Examples 1 to 4 using the compounds of Formula I and Formula II together as an electrolyte solution additive, it may be confirmed that resistance increase rates and capacity retentions were significantly improved in comparison to Comparative Example 1 without using an additive.

With respect to Comparative Examples 2 and 4 using only Formula I-1 as an additive, it was found that initial resistances were significantly higher than those of the examples, and, with respect to Comparative Examples 3 and 5 using only Formula II-1 as an additive, it was found that initial resistances were lower, but an increase in resistance and a decrease in capacity after high-temperature cycles were large.

The invention claimed is:
1. A non-aqueous electrolyte, comprising:
an organic solvent;
a lithium salt; and
an additive,
wherein the additive comprises a compound represented by Formula I and a compound represented by Formula II

[Formula I]

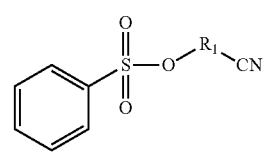

wherein, in Formula I, $R_1$ is an alkylene group having 1 to 4 carbon atoms

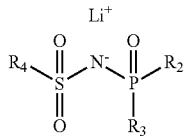
[Formula II]

wherein, in Formula II, $R_2$, $R_3$, and $R_4$ are each independently a fluorine atom or a fluorine-substituted alkyl group having 1 to 10 carbon atoms, and wherein the additive further comprises a silane-based compound.

2. The non-aqueous electrolyte of claim 1, wherein the compound represented by Formula I is a compound represented by Formula I-1

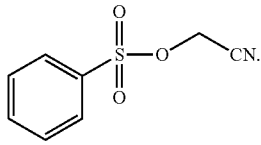
[Formula I-1]

3. The non-aqueous electrolyte of claim 1, wherein the compound represented by Formula II is a compound represented by Formula II-1

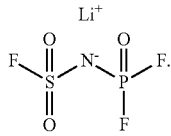
[Formula II-1]

4. The non-aqueous electrolyte of claim 1, wherein the compound represented by Formula I is present in an amount of 0.5 wt % to 2 wt % based on a total weight of the non-aqueous electrolyte.

5. The non-aqueous electrolyte of claim 1, wherein the compound represented by Formula II is present in an amount of 0.5 wt % to 2 wt % based on a total weight of the non-aqueous electrolyte.

6. A lithium secondary battery, comprising:
a positive electrode including a positive electrode active material;
a negative electrode including a negative electrode active material;
a separator disposed between the negative electrode and the positive electrode; and
the non-aqueous electrolyte of claim 1.

7. The lithium secondary battery of claim 6, wherein the positive electrode active material is a lithium composite transition metal oxide having an amount of nickel of 50 atm % or more, based on the total amount of transition metals in the lithium composite transition metal oxide.

8. The lithium secondary battery of claim 6, wherein the positive electrode active material is a lithium composite transition metal oxide represented by Formula III $Li_x[Ni_yCo_zMn_wM^1_v]O_{2-p}A_p$ [Formula III]

wherein, in Formula III, $M^1$ comprises at least one of tungsten (W), copper (Cu), iron (Fe), vanadium (V), chromium (Cr), titanium (Ti), zirconium (Zr), zinc (Zn), aluminum (Al), indium (In), tantalum (Ta), yttrium (Y), lanthanum (La), strontium (Sr), gallium (Ga), scandium (Sc), gadolinium (Gd), samarium (Sm), calcium (Ca), cerium (Ce), niobium (Nb), magnesium (Mg), boron (B), or molybdenum (Mo), A comprises at least one of fluorine (F), chlorine (Cl), bromine (Br), iodine (I), astatine (At), or sulfur(S), and $0.8 \leq x \leq 1.2$, $0.5 \leq y < 1$, $0 < z < 0.5$, $0 < w < 0.5$, $0 \leq v \leq 0.2$, and $0 \leq p \leq 0.2$.

9. The lithium secondary battery of claim 6, wherein the negative electrode active material comprises a carbon-based negative electrode active material, a silicon-based negative electrode active material, or a mixture thereof.

10. The lithium secondary battery of claim 6, wherein the negative electrode active material comprises a silicon-based negative electrode active material.

* * * * *